US008690531B2

(12) United States Patent
Tudor et al.

(10) Patent No.: US 8,690,531 B2
(45) Date of Patent: Apr. 8, 2014

(54) VANE WITH SPAR MOUNTED COMPOSITE AIRFOIL

(75) Inventors: Courtney James Tudor, Cincinnati, OH (US); Frank Worthoff, West Chester, OH (US); David William Crall, Loveland, OH (US); Seth Alexander McDonald, Cincinnati, OH (US)

(73) Assignee: General Electroc Co., Schenectady, NY (US)

( * ) Notice: Subject to any disclaimer, the term of this patent is extended or adjusted under 35 U.S.C. 154(b) by 603 days.

(21) Appl. No.: 12/982,448

(22) Filed: Dec. 30, 2010

(65) Prior Publication Data
US 2012/0171025 A1 Jul. 5, 2012

(51) Int. Cl.
F01D 9/04 (2006.01)

(52) U.S. Cl.
USPC ........................................ 415/209.4

(58) Field of Classification Search
None
See application file for complete search history.

(56) References Cited

U.S. PATENT DOCUMENTS

| 3,442,442 | A | * | 5/1969 | Seiwert ......................... 415/200 |
| 4,594,761 | A | * | 6/1986 | Murphy et al. ............. 29/889.71 |
| 5,320,490 | A | * | 6/1994 | Corbin et al. .............. 415/209.3 |
| 5,454,691 | A | | 10/1995 | Henri et al. |
| 5,927,130 | A | | 7/1999 | Watson et al. |
| 6,619,917 | B2 | | 9/2003 | Glover et al. |
| 6,676,080 | B2 | | 1/2004 | Violette |
| 7,722,320 | B2 | * | 5/2010 | Matsumoto et al. .......... 415/191 |
| 7,722,321 | B2 | | 5/2010 | Lhoest et al. |
| 7,753,653 | B2 | | 7/2010 | Cairo et al. |
| 2010/0150707 | A1 | | 6/2010 | Jevons |

FOREIGN PATENT DOCUMENTS

GB 2 264 755 A 8/1993
WO WO 2010/122053 A1 10/2010

OTHER PUBLICATIONS

European Search Report, EP 11 19 4232, Ref. 248461-7/17145, Apr. 4, 2012, 6 pages.
European Search Report, EP 11 19 4233, Ref. 248461-4/17144, Apr. 4, 2012, 7 pages.
U.S. Appl. No. 12/982,411, filed Dec. 30, 2010, Tudor et al.

* cited by examiner

*Primary Examiner* — Nathaniel Wiehe
*Assistant Examiner* — Jeffrey A Brownson
(74) *Attorney, Agent, or Firm* — General Electric Co.; Steven J. Rosen

(57) ABSTRACT

A vane includes a composite airfoil having one or more outer pockets and one or more outer spars received therein respectively. The outer spars extending radially inwardly from an outer bridge of the outer vane mount outwardly supporting airfoil. The spars may be integrally formed with the bridge and adhesively bonded to the composite airfoil within the pockets with a passage extending between an airfoil base and an airfoil tip. A metallic leading edge tip may be disposed along the leading edge of the composite airfoil. A gas turbine engine annular fan frame incorporates the vanes in an annular row of composite outlet guide vanes extending radially between and connecting radially inner and outer rings of the fan frame.

43 Claims, 8 Drawing Sheets

VANE WITH SPAR MOUNTED COMPOSITE AIRFOIL

BACKGROUND OF THE INVENTION

1. Field of the Invention

The invention relates to mounting of gas turbine engine composite airfoils and, particularly, for mounting the airfoils in aircraft gas turbine engines.

2. Description of Related Art

Bypass gas turbine engines of the turbofan type generally includes a forward fan and booster compressor, a middle core engine, and an aft low pressure power turbine. The core engine includes a high pressure compressor, a combustor, and a high pressure turbine in a serial flow relationship. The high pressure compressor and high pressure turbine of the core engine are interconnected by a high pressure shaft. The high pressure compressor, turbine, and shaft essentially form the high pressure rotor. The high pressure compressor is rotatably driven to compress air entering the core engine to a relatively high pressure. This high pressure air is then mixed with fuel in the combustor and ignited to form a high energy gas stream. The gas stream flows aft and passes through the high pressure turbine, rotatably driving it and the high pressure shaft which, in turn, rotatably drives the compressor.

The gas stream leaving the high pressure turbine is expanded through a second or low pressure turbine. The low pressure turbine rotatably drives the fan and booster compressor via a low pressure shaft, all of which form the low pressure rotor. The low pressure shaft extends through the high pressure rotor. The fan is part of a fan section of the engine and further includes a fan casing surrounding the fan and supported by a fan frame. Typically, a fan frame includes structural fan struts radially extending across a fan bypass duct. A forward vertical support mount on the fan casing is used to pivotably join and support the engine to a pylon on the aircraft and a thrust mount on the frame located radially inwardly of the bypass duct is used to transfer thrust loads of the engine to the aircraft through the pylon.

The frame may further include fan outlet guide vanes circumferentially distributed between the struts that are used to straighten fan airflow exiting the bypass duct. The fan struts and outlet guide vanes are typically made of metal which are heavier than available composite materials. Outlet guide vane assemblies are used to remove swirl before a fan nozzle at the end of a bypass duct. Such outlet guide vane assemblies are configured to turn the airflow discharged from the fan to a substantially axial direction prior to the fan flow being channeled through the bypass duct. In addition to turning the fan airflow, the outlet guide vane assembly also provides structural stiffness to the fan frame.

It is very desirable to incorporate composite materials in the engine in order to lower the weight of the engine which provides a more fuel efficient engine and aircraft. It is known to manufacture aircraft gas turbine engine vane airfoils from composite materials. What is further desired are mounting systems for securely and robustly mounting composite airfoils in the fan frame assembly that will enhance the life of the airfoils and fan frame assembly.

Vanes incorporating composite airfoils especially ones that are structural vanes, must transfer loads from the composite airfoil to metallic support structure such as the fan frame. In addition to being structurally sound it is important for the vane to be low in weight. It is important to transfer the load from the composite airfoil to the metallic airfoil support structure and to the rest of the fan frame with minimal weight impact.

SUMMARY OF THE INVENTION

A vane includes a composite airfoil having pressure and suction sides extending outwardly from an airfoil base to an airfoil tip and chordwise spaced apart leading and trailing edges of the composite airfoil at or near forward and aft ends of the vane. The composite airfoil is supported by an outer vane mount which includes one or more outer spars extending radially inwardly from an outer bridge of the outer vane mount. The outer spars are completely received within one or more outer pockets respectively extending radially into the composite airfoil from the airfoil tip. The outer spars are completely encased by the composite airfoil.

The outer spars may be adhesively bonded to the composite airfoil within the outer pockets. The composite airfoil may have a passage extending between the airfoil base and the airfoil tip. The outer bridge may extend axially between chordwise spaced apart forward and aft sets of pressure and suction side ears extending circumferentially or perpendicularly away from pressure and suction side surfaces of the outer vane mount.

The outer spars may be integral with the outer bridge and may have been integrally formed with the outer bridge such as by forging or casting. A metallic leading edge tip may be disposed along the leading edge of the composite airfoil. A metallic leading edge tip my be disposed along the leading edge of the composite airfoil.

A more particular embodiment of the vane includes the outer vane mount having forward and aft outer spars extending radially inwardly from an outer bridge of the outer vane mount, forward and aft outer pockets extending radially into the composite airfoil from the airfoil tip, and the forward and aft outer spars received within the forward and aft outer pockets respectively. A more particular embodiment of the inner vane mount includes forward and aft inner spars extending radially outwardly from an inner bridge of the inner vane mount and received within forward and aft inner pockets disposed in the composite airfoil.

A gas turbine engine annular fan frame includes an annular row of composite outlet guide vanes above extending radially between and connecting radially inner and outer rings of the fan frame. The outlet guide vanes, various embodiments of the vanes having been disclosed above, are mounted in axially extending inner and outer vane mounts attached to the inner and outer rings respectively. A passage in the composite airfoil may extend between the airfoil base and the airfoil tip and be disposed chordwise between the forward and aft outer pockets and the forward and aft inner pockets.

The forward and aft inner spars may be integral with the inner bridge and the forward and aft outer spars may be integral with the outer bridge.

An alternative embodiment of the outer bridge includes a depressed outer surface of the outer bridge between the forward and aft sets of pressure and suction side ears and a middle section of the outer bridge between the forward and aft sets of pressure and suction side ears. A bridge depression extends into the middle section and outwardly bounded by the depressed outer surface.

BRIEF DESCRIPTION OF THE DRAWINGS

The foregoing aspects and other features of the invention are explained in the following description, taken in connection with the accompanying drawings where.

DETAILED DESCRIPTION OF THE INVENTION

Figure 1:
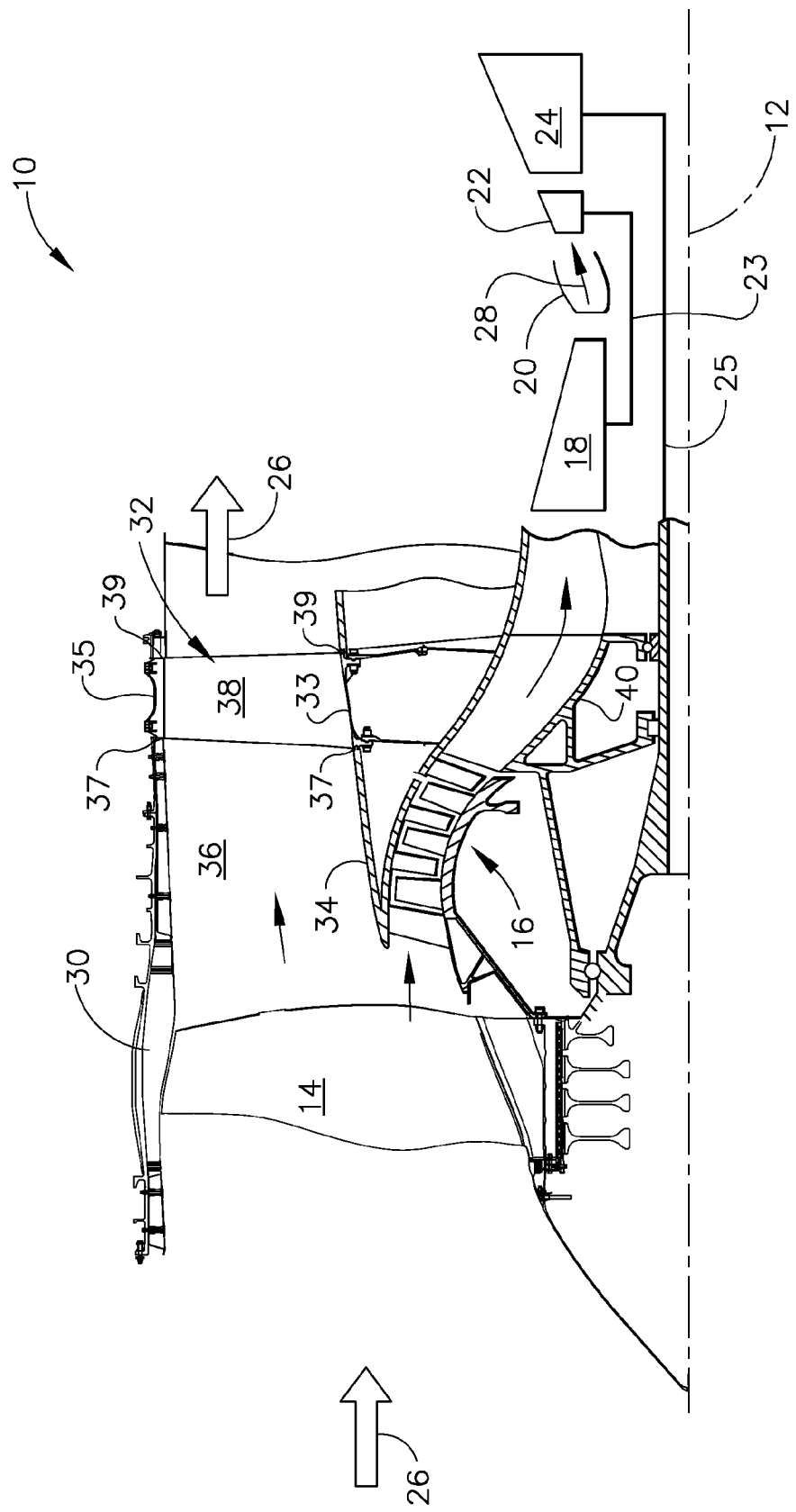
FIG. 1 is a longitudinal part sectional and part diagrammatical view illustration of an exemplary embodiment of an aircraft turbofan gas turbine engine with a fan frame assembly including outlet guide vanes having spar mounted composite airfoils.

Illustrated in FIG. 1 is an exemplary aircraft turbofan gas turbine engine 10 circumscribed about an engine centerline axis 12 and suitably designed to be mounted to a wing or fuselage of an aircraft. The engine 10 includes, in downstream serial flow communication, a fan 14, a booster or a low pressure compressor 16, a high pressure compressor 18, a combustor 20, a high pressure turbine (HPT) 22, and a low pressure turbine (LPT) 24. The HPT or high pressure turbine 22 is joined by a high pressure drive shaft 23 to the high pressure compressor 18. The LPT or low pressure turbine 24 is joined by a low pressure drive shaft 25 to both the fan 14 and booster or low pressure compressor 16.

In typical operation, air 26 is pressurized by the fan 14 and an inner portion of this air is channeled through the low pressure compressor 16 which further pressurizes the air. The pressurized air is then flowed to the high pressure compressor 18 which further pressurizes the air.

The pressurized air is mixed with fuel in the combustor 20 for generating hot combustion gases 28 that flow downstream in turn through the HPT 22 and the LPT 24. Energy is extracted in the two turbines for powering the fan 14, low pressure compressor 16, and the high pressure compressor 18. A flow splitter 34 surrounding the booster compressor 16 immediately behind the fan 14 includes a sharp leading edge which splits the fan air 26 pressurized by the fan 14 into a radially inner stream channeled through the booster compressor 16 and a radially outer stream channeled through the bypass duct 36.

A fan nacelle 30 surrounding the fan 14 is supported by an annular fan frame 32. The low pressure compressor 16 is suitably joined to the fan 14 forward of the fan frame 32, and is disposed radially inboard of an annular flow splitter 34 spaced radially inwardly from an inner surface of the fan nacelle 30 to partially define an annular fan bypass duct 36 therebetween. The fan frame 32 is supports the nacelle 30.

The fan frame 32 includes an annular row of composite outlet guide vanes 38 (OGVs) extending radially outwardly through the fan bypass duct 36 and suitably attached to radially inner and outer rings 33, 35 of the fan frame 32. The composite outlet guide vanes 38 are the only structural elements of the fan frame 32 connecting the radially inner and outer rings 33, 35 of the fan frame 32. There are no separate structural struts of the fan frame 32 passing through the fan bypass duct 36. The outlet guide vanes 38 provide both removal of swirl by turning of the bypass flow in the bypass duct 36 and structural capability for the fan frame 32. The outlet guide vanes 38 are mounted to the radially inner and outer rings 33, 35 of the fan frame 32. The inner and outer rings 33, 35 include forward and aft rails 37, 39 illustrated in more detail in FIG. 6.

Figure 2:
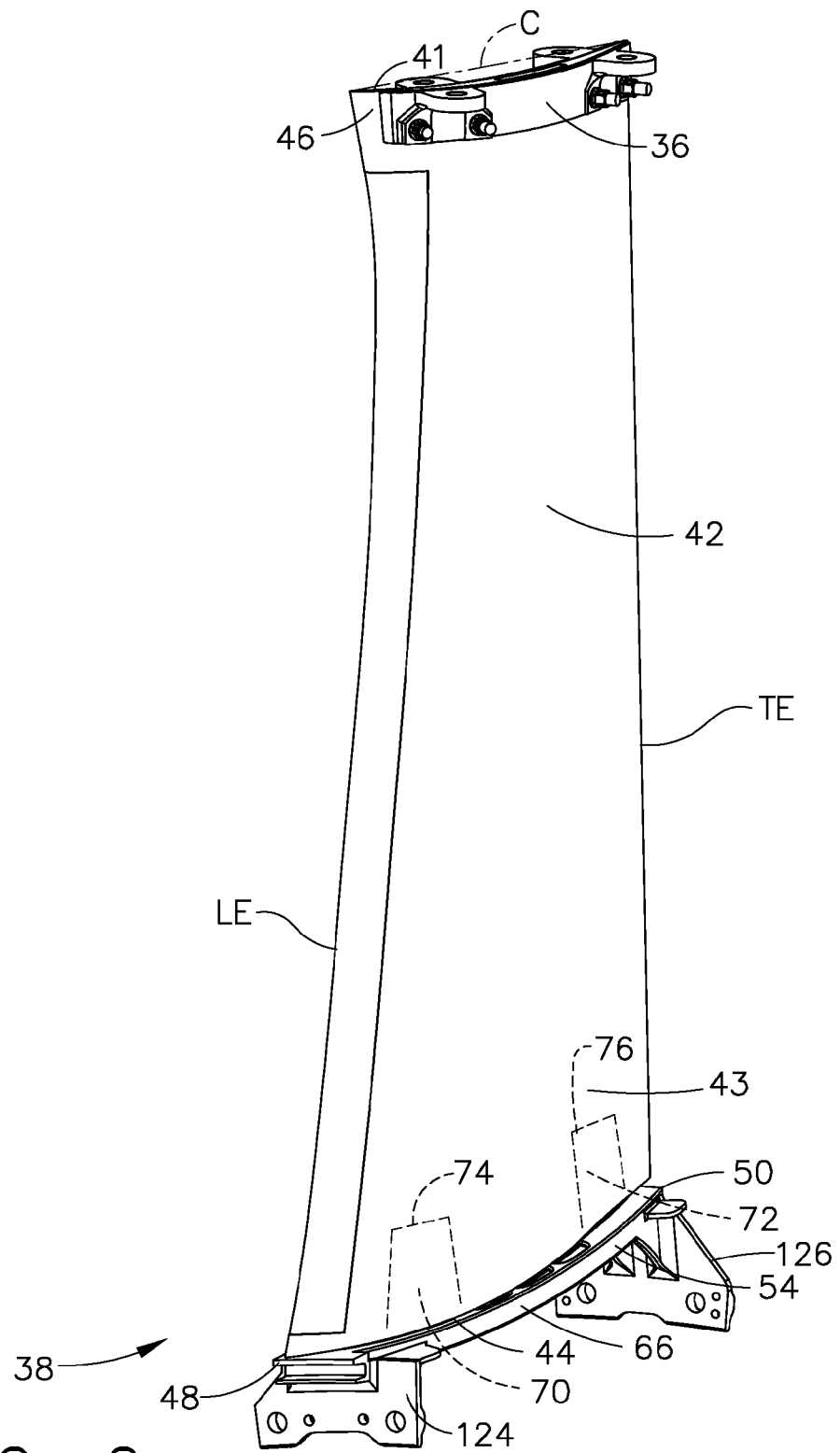
FIG. 2 is a perspective view illustration of an outlet guide vane illustrated in FIG. 1.

Referring to FIG. 2, each of the outlet guide vanes 38 is an assembly including a composite airfoil 42 having pressure and suction sides 41, 43 extending outwardly from an airfoil base 44 to an airfoil tip 46. The exemplary pressure and suction sides 41, 43 illustrated herein are concave and convex respectively. The composite airfoil 42 includes chordwise spaced apart leading and trailing edges LE, TE at or near forward and aft ends 48, 50 of the outlet guide vane 38. A chord C is defined as a line between leading and trailing edges LE, TE of an airfoil cross section of an airfoil. A metallic leading edge tip 52 is disposed along the leading edge LE to protect the composite airfoil against foreign object damage (FOD) and bird ingestion damage. Axially extending inner and outer vane mounts 54, 56 provide for attaching the outlet guide vane 38 to the inner and outer rings 33, 35 of the fan frame 32 (illustrated in FIGS. 1 and 6).

The inner vane mount 54 is illustrated herein as but not limited to being metallic and includes a bridge 66 extending axially between forward and aft flanges 124, 126 depending radially inwardly from the inner vane mount 54 at the forward and aft ends 48, 50 of the outlet guide vane 38. The forward and aft flanges 124, 126 are bolted to the forward and aft rails 37, 39 respectively of the inner ring 33 of the fan frame 32. One or more spars extend away from the bridge 66. The exemplary embodiment of the inner vane mount 54 illustrated in FIGS. 2 and 3 include forward and aft spars 70, 72 extending radially away and more particularly radially outwardly from the bridge 66.

Figure 3:
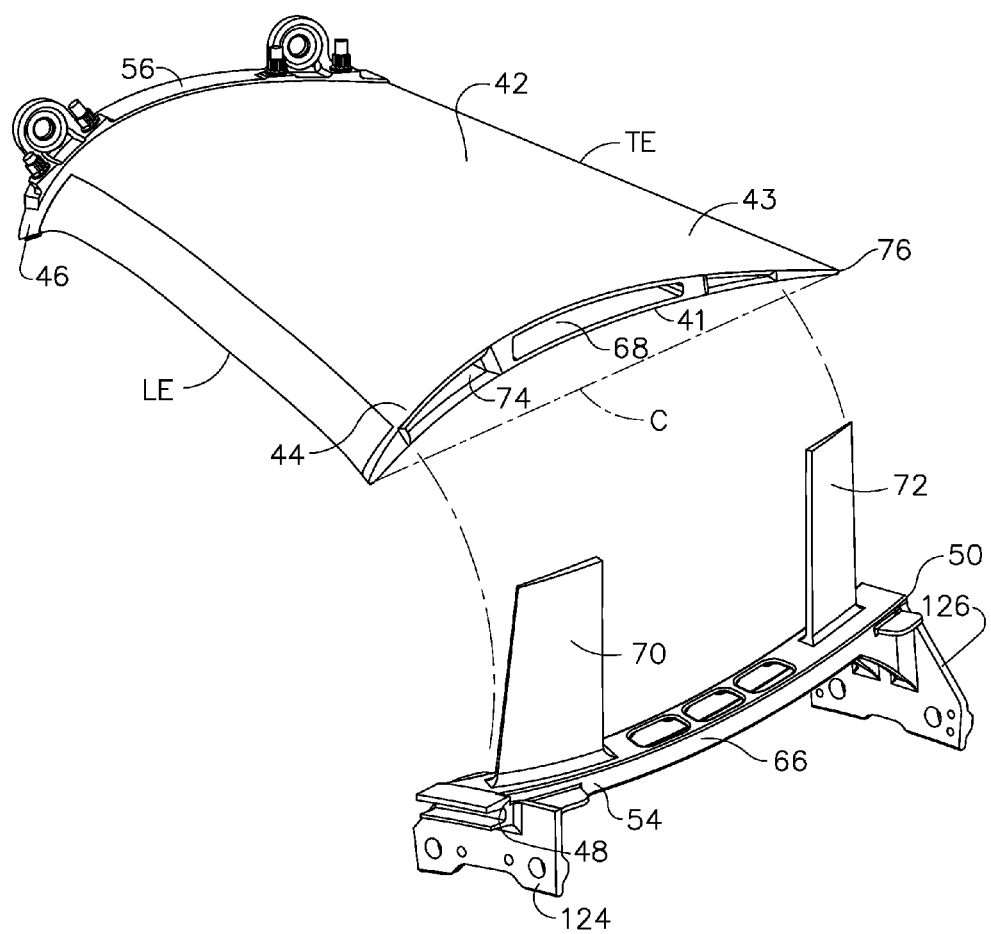
FIG. 3 is a partially exploded view illustration of the composite airfoil and a inner vane mount illustrated in FIG. 2.

Forward and aft pockets 74, 76 extending radially into the composite airfoil 42 from the airfoil base 44 are sized and located to receive the forward and aft spars 70, 72 therein respectively as illustrated in FIG. 3. The forward and aft spars 70, 72 are completely encased by and adhesively or otherwise bonded or attached to the composite airfoil 42 within the forward and aft pockets 74, 76 respectively. The spars are preferably integral with the bridge 66. The spars may be integrally formed with spar using forging or casting. The exemplary embodiment of the composite airfoil 42 illustrated herein is hollow having a void or a passage 68 extending from the airfoil base 44 to the airfoil tip 46 and disposed chordwise between the forward and aft pockets 74, 76.

Figure 4:
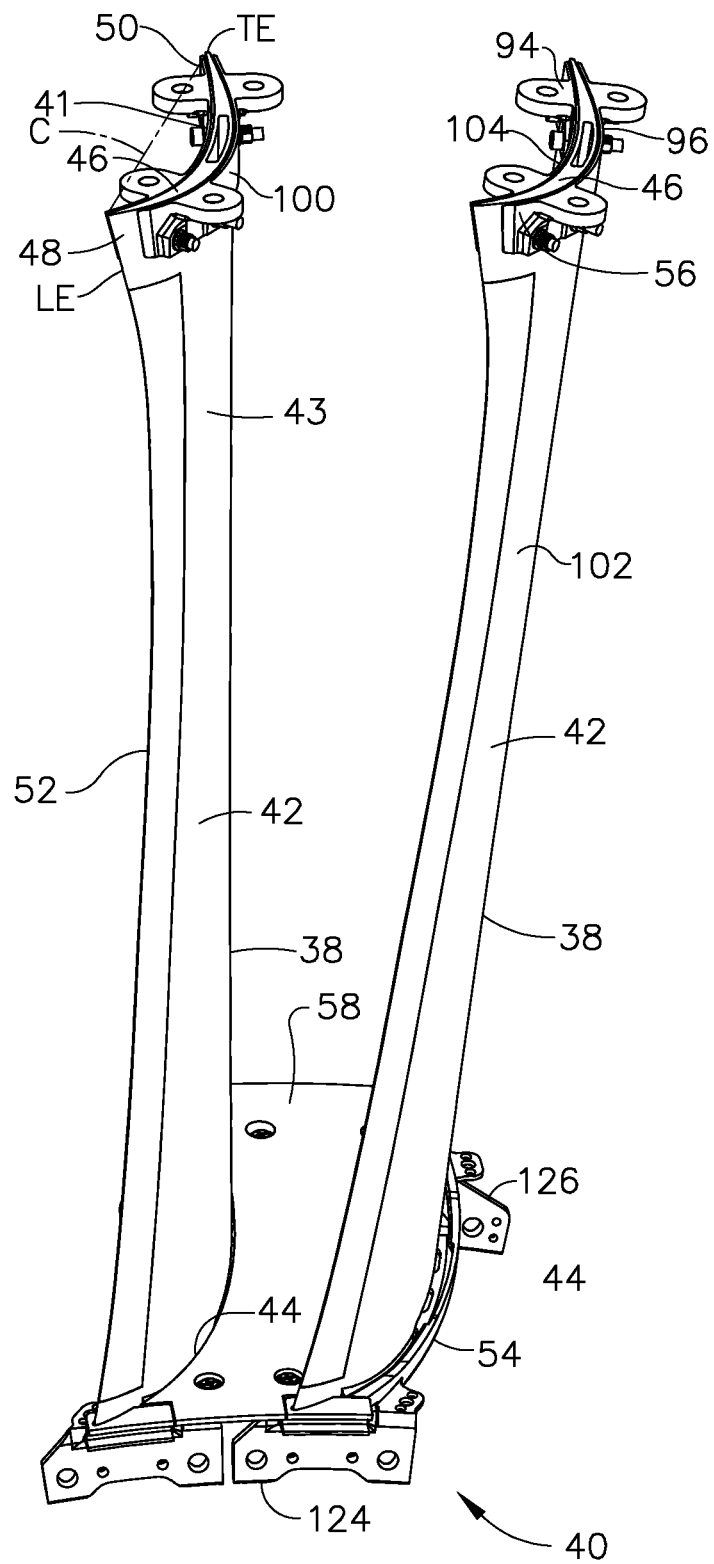
FIG. 4 is a perspective view illustration of a couple adjacent outlet guide vane illustrated in FIG. 1.

Illustrated in FIG. 4 is a pair 40 of adjacent outle3 guide vanes 38. Each of the outlet guide vanes 38 is an assembly including the composite airfoil 42. The composite airfoil 42 includes pressure and suction sides 41, 43 extending outwardly from an airfoil base 44 to an airfoil tip 46. The exemplary pressure and suction sides 41, 43 illustrated herein are concave and convex respectively. The composite airfoil 42 includes chordwise spaced apart leading and trailing edges LE, TE at or near forward and aft ends 48, 50 of the outlet guide vane 38. A chord C is defined as a line between leading and trailing edges LE, TE of an airfoil cross section of an airfoil. A metal leading edge tip 52 is disposed along the leading edge LE to protect the composite airfoil against foreign object damage (FOD) and bird ingestion damage.

Figure 6:
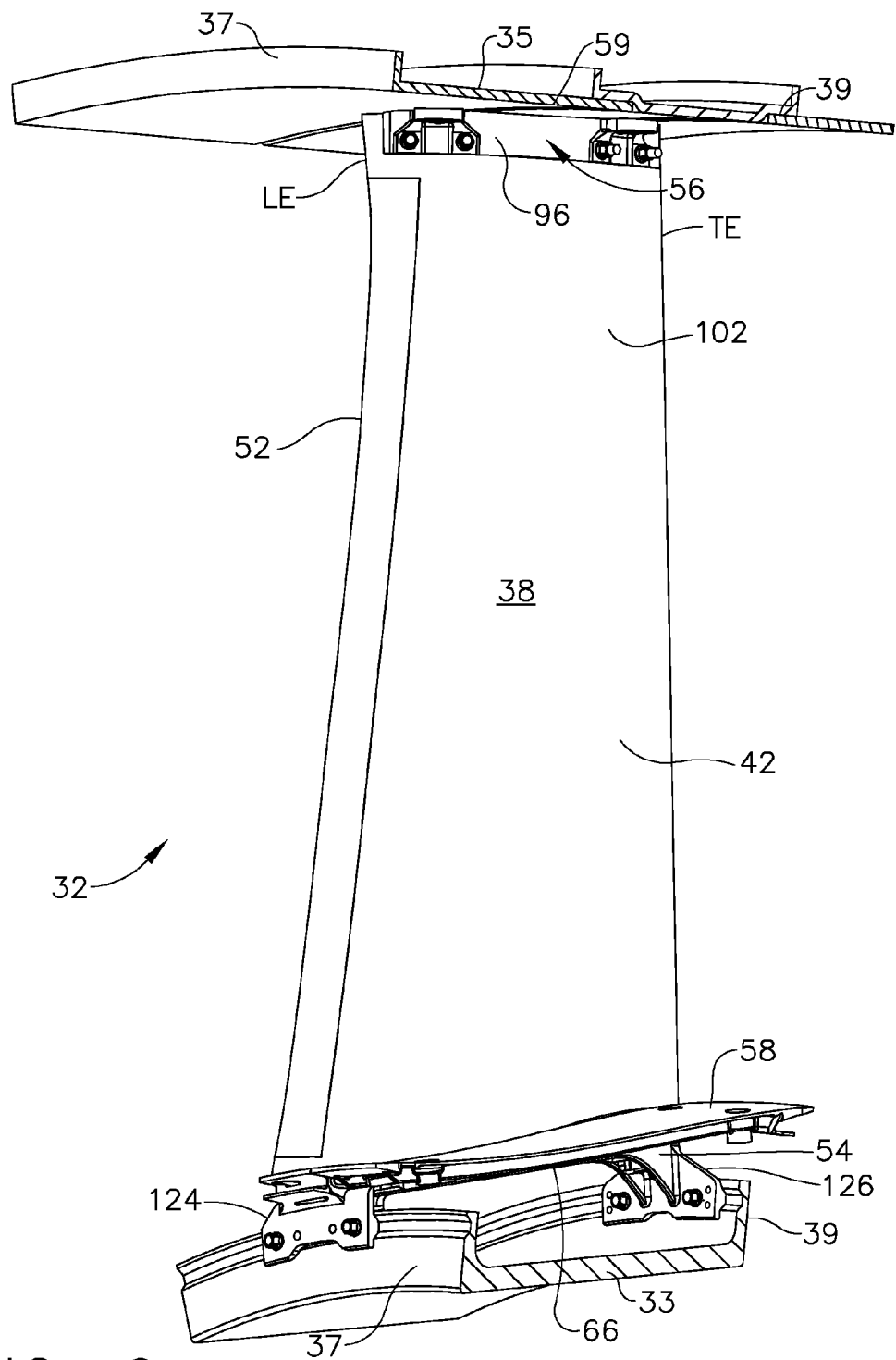
FIG. 6 is an enlarged perspective view illustration of an outlet guide vane mounted between inner and outer rings of the fan frame illustrated in FIG. 1.
Figure 7:
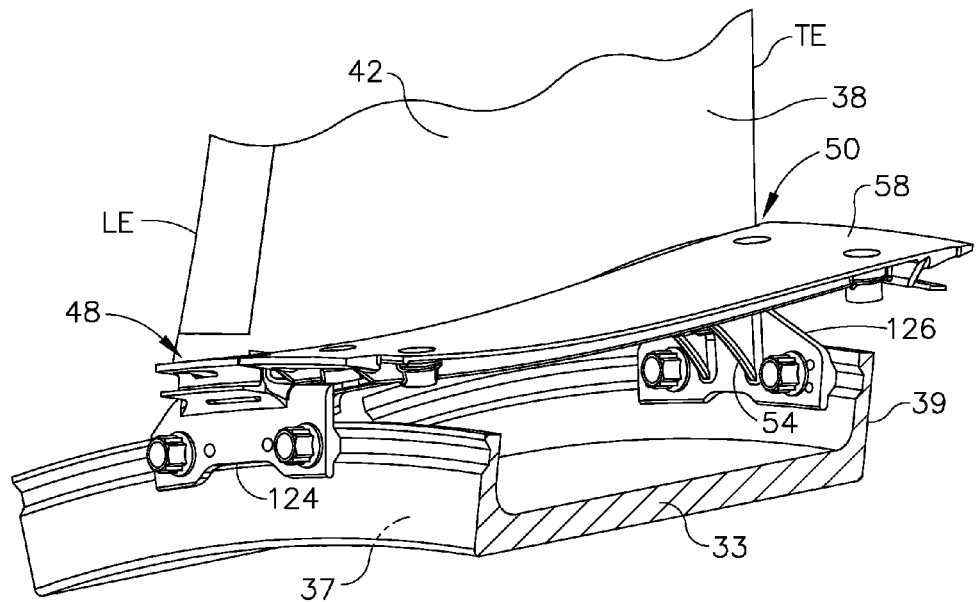
FIG. 7 is an enlarged perspective view illustration of an outlet guide vane mounted to an inner ring of the fan frame illustrated in FIG. 1.

Forward and aft flanges 124, 126 depend radially inwardly from the inner vane mount 54 at the forward and aft ends 48, 50 of the outlet guide vane 38 as illustrated in FIGS. 6 and 7. The forward and aft flanges 124, 126 are bolted to the forward and aft rails 37, 39 respectively of the inner ring 33 of the fan frame 32.

Figure 5:
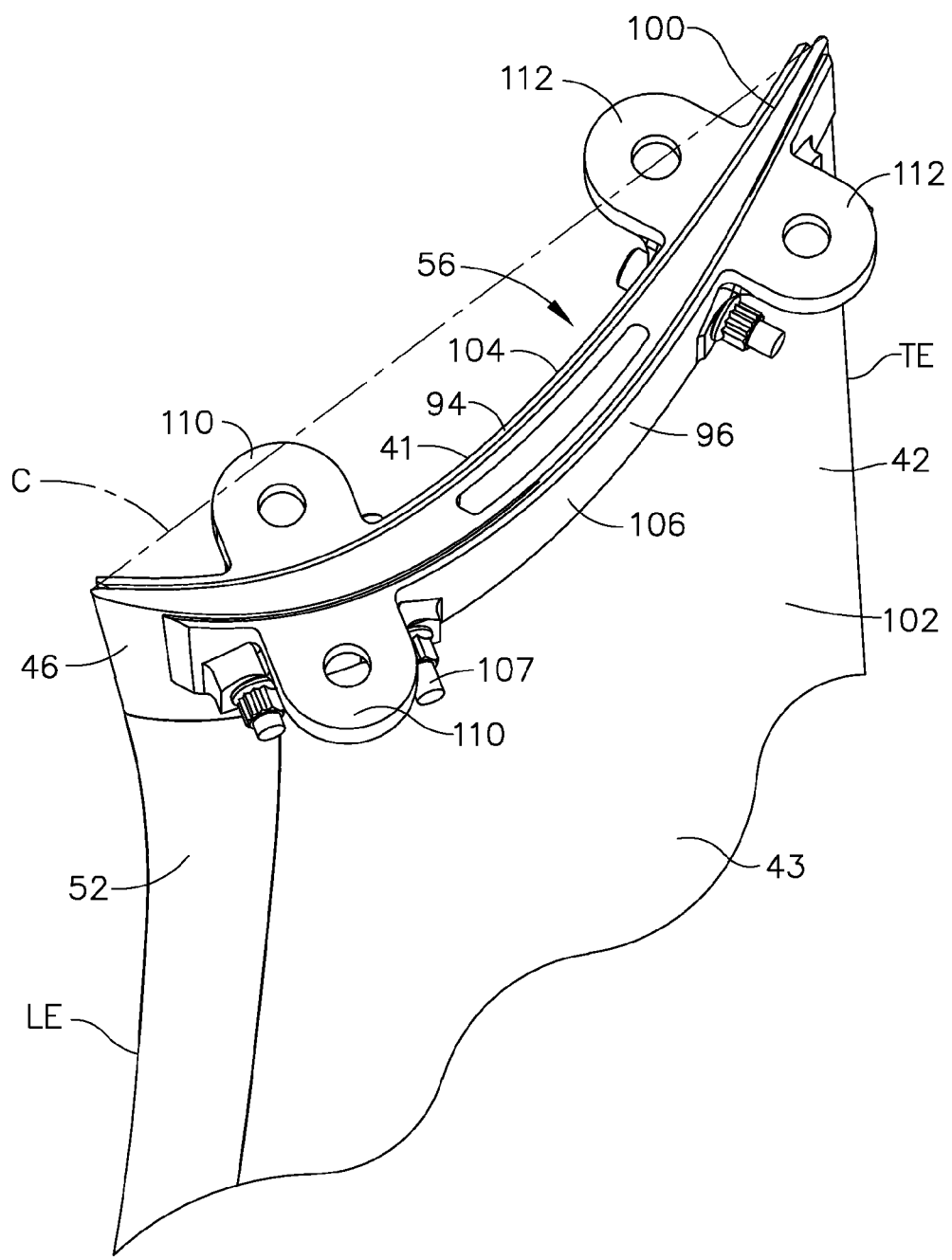
FIG. 5 is an enlarged perspective view illustration of an outer vane mount assembly supporting the composite airfoil illustrated in FIG. 2.
Figure 8:
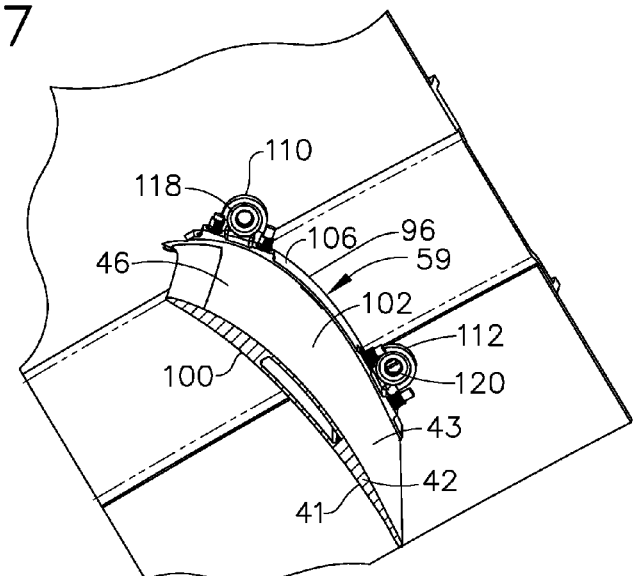
FIG. 8 is an enlarged perspective view illustration of an outlet guide vane mounted to a fan outer fan casing of the fan frame illustrated in FIG. 1.

Referring to FIGS. 5, 6, and 8, the outer vane mount 56 is illustrated herein as an assembly of widthwise spaced apart pressure and suction side brackets 94, 96 that are mounted to pressure and suction sides 100, 102 respectively of the composite airfoil 42 at the airfoil tip 46. The pressure and suction side brackets 94, 96 include pressure and suction side walls 104, 106 that conform to the shape of the pressure and suction sides 100, 102 respectively of the composite airfoil 42 at the airfoil tip 46 where the pressure and suction side walls 104, 106 are attached to the airfoil tip 46. Chordwise spaced apart upstream and downstream ears 110, 112 extend circumferentially or perpendicularly away from the pressure and suction side walls 104, 106. The ears are screwed to the outer fan casing 59 or a shroud in the casing by screw not illustrated herein. Bolts 107 disposed through corresponding chordwise spaced apart pressure and suction side holes 108, 109 through the pressure and suction side walls 104, 106 illustrate herein one type of means to attach the pressure and suction side walls 104, 106 to the airfoil tip 46.

Referring to FIGS. 4-8, fairings 58 are mounted to and between adjacent inner vane mounts 54 the outlet guide vanes 38. The outer vane mounts 56 are attached to an outer fan casing 59 which serves as the outer ring 35 of the fan frame 32. The fairings 58 and the fan casing 59 bound and provide a fan frame flowpath 61 through the fan frame 32 between the composite airfoils 42 of the outlet guide vane 38.

Figure 9:
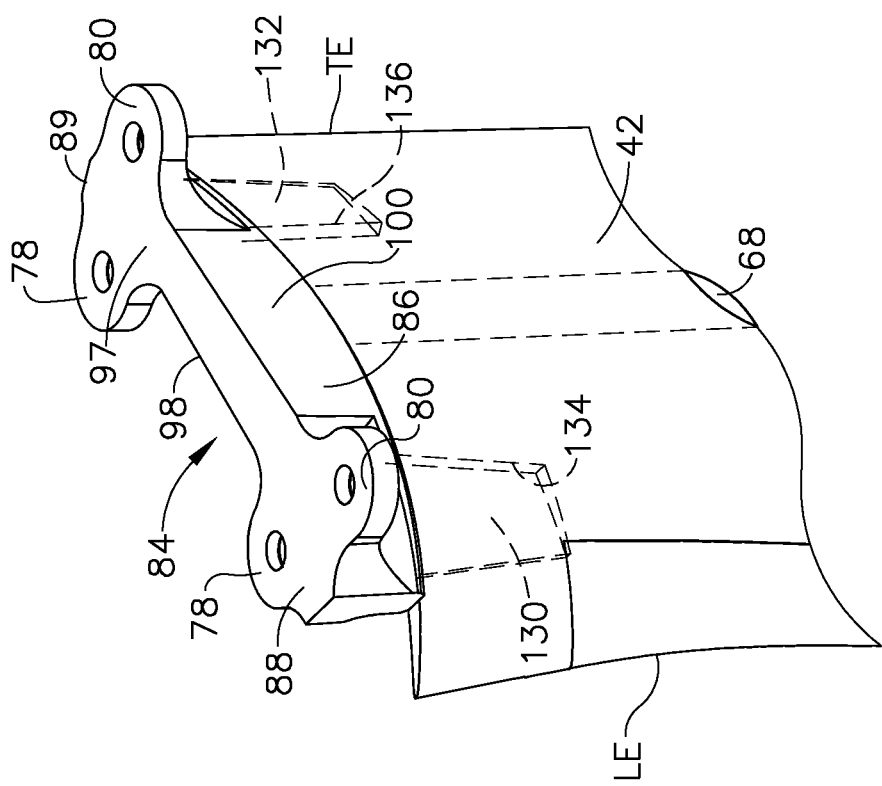
FIG. 9 is a perspective diagrammatical view illustration of an exemplary embodiment of spars extending radially inwardly from an outer vane mount into and for support of a composite airfoil.

Illustrated in FIG. 9 is an axially extending alternative outer vane mount 84 illustrated herein as but not limited to being metallic and including an outer bridge 86 extending axially between chordwise spaced apart forward and aft sets 88, 90 of pressure and suction side ears 78, 80 extend circumferentially or perpendicularly away from pressure and suction side surfaces 98, 100 of the outer vane mount 84. The ears are screwed to the outer fan casing 59 or a shroud in the casing by screw not illustrated herein.

One or more outer spars extend away from the outer bridge 86. The exemplary embodiment of the outer vane mount 84 illustrated in FIGS. 9 and 10 include forward and aft outer spars 130, 132 extending radially away and more particularly radially inwardly from the outer bridge 86. Forward and aft outer pockets 134, 136 extending radially into the composite airfoil 42 from the airfoil tip 46 are sized and located to receive the forward and aft outer spars 130, 132 therein respectively. The forward and aft outer spars 130, 132 are completely encased by and adhesively or otherwise bonded or attached to the composite airfoil 42 within the forward and aft outer pockets 134, 136 respectively.

The spars are preferably integral with the outer bridge 86. The spars may be integrally formed with spar using forging or casting. The exemplary embodiment of the composite airfoil 42 illustrated herein is hollow having a void or a passage 68 extending from the airfoil base 44 to the airfoil tip 46 and disposed chordwise between the forward and aft outer pockets 134, 136.

Figure 10:
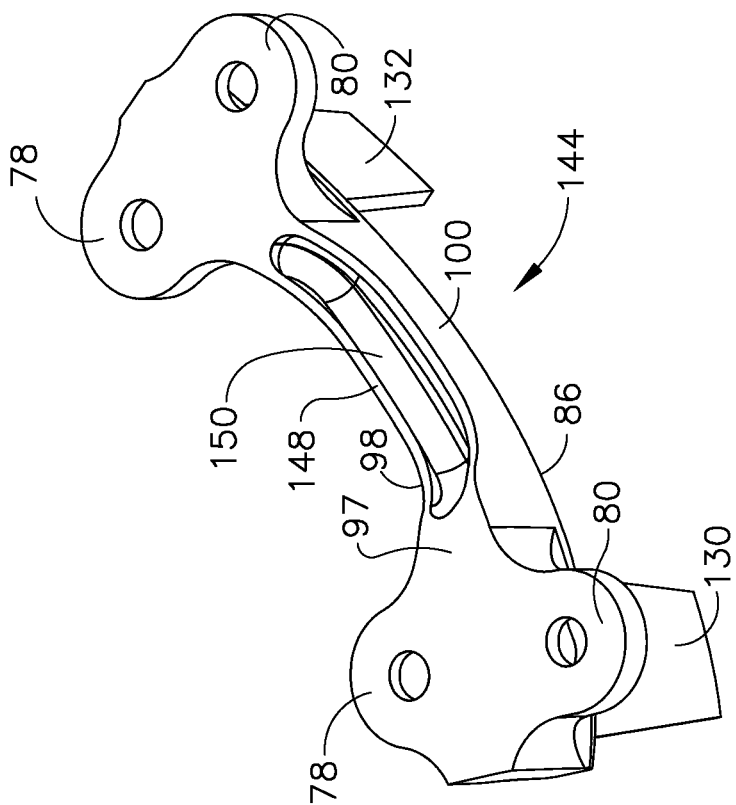
FIG. 10 is a perspective view illustration of an alternative outer vane mount to mount illustrated in FIG. 9.

Illustrated in FIG. 10 is an axially extending alternative low weight outer vane mount 144 with a low weight outer bridge 146 extending axially between chordwise spaced apart forward and aft sets 88, 90 of pressure and suction side ears 78, 80 extend circumferentially or perpendicularly away from pressure and suction side surfaces 98, 100 of the outer vane mount 84. While the outer bridge 86 illustrated in FIG. 9 has a relatively flat outer surface 97, the outer surface 97 low weight outer bridge 146 is depressed between the forward and aft sets 88, 90 of pressure and suction side ears 78, 80. The low weight outer bridge 146 has a middle section 148 between the forward and aft sets 88, 90 of pressure and suction side ears 78, 80 that includes a bridge depression 150 extending into the middle section 148 and outwardly bounded by the depressed outer surface 97.

The present invention has been described in an illustrative manner. It is to be understood that the terminology which has been used is intended to be in the nature of words of description rather than of limitation. While there have been described herein, what are considered to be preferred and exemplary embodiments of the present invention, other modifications of the invention shall be apparent to those skilled in the art from the teachings herein and, it is, therefore, desired to be secured in the appended claims all such modifications as fall within the true spirit and scope of the invention.

Accordingly, what is desired to be secured by Letters Patent of the United States is the invention as defined and differentiated in the following claims:

What is claimed is:

1. A vane comprising:
    a composite airfoil having pressure and suction sides extending outwardly from an airfoil base to an airfoil tip,
    chordwise spaced apart leading and trailing edges of the composite airfoil at or near forward and aft ends of the vane,
    the composite airfoil supported by an outer vane mount,
    the outer vane mount including one or more outer spars extending radially inwardly from an outer bridge of the outer vane mount,
    one or more outer pockets extending radially into the composite airfoil from the airfoil tip, and
    the one or more outer spars completely received within the one or more outer pockets respectively and the one or more outer spars completely encased by the composite airfoil.

2. A vane as claimed in claim 1, further comprising the one or more outer spars adhesively bonded to the composite airfoil within the one or more outer pockets.

3. A vane as claimed in claim 2, further comprising a passage in the composite airfoil extending between the airfoil base and the airfoil tip.

4. A vane as claimed in claim 2 further comprising the outer bridge extending axially between chordwise spaced apart forward and aft sets of pressure and suction side ears extending circumferentially or perpendicularly away from pressure and suction side surfaces of the outer vane mount.

5. A vane as claimed in claim 1, further comprising the one or more outer spars being integral with the outer bridge.

6. A vane as claimed in claim 1, further comprising the one or more outer spars having been integrally formed with the bridge by forging or casting.

7. A vane as claimed in claim 6, further comprising a metallic leading edge tip disposed along the leading edge of the composite airfoil.

8. A vane as claimed in claim 6, further comprising the one or more outer spars adhesively bonded to the composite airfoil within the one or more outer pockets.

9. A vane as claimed in claim 7 further comprising the outer bridge extending axially between chordwise spaced apart forward and aft sets of pressure and suction side ears extending circumferentially or perpendicularly away from pressure and suction side surfaces of the outer vane mount.

10. A vane as claimed in claim 9, further comprising the one or more outer spars adhesively bonded to the composite airfoil within the one or more outer pockets.

11. A vane as claimed in claim 10, further comprising a passage in the composite airfoil extending between the airfoil base and the airfoil tip.

12. A vane comprising:
a composite airfoil having pressure and suction sides extending radially outwardly from an airfoil base to an airfoil tip,
chordwise spaced apart leading and trailing edges of the composite airfoil at or near forward and aft ends of the vane,
the composite airfoil supported by an outer vane mount,
the outer vane mount including forward and aft outer spars extending radially inwardly from an outer bridge of the outer vane mount,
forward and aft outer pockets extending radially into the composite airfoil from the airfoil tip, and
the forward and aft outer spars completely received within the forward and aft outer pockets respectively and the forward and aft outer spars completely encased by the composite airfoil.

13. A vane as claimed in claim 12, further comprising the forward and aft outer spars adhesively bonded to the composite airfoil within the forward and aft outer pockets.

14. A vane as claimed in claim 12, further comprising:
a passage in the composite airfoil,
the passage extending between the airfoil base and the airfoil tip, and
the passage disposed chordwise between the forward and aft outer pockets.

15. A vane as claimed in claim 14 further comprising the outer bridge extending axially between chordwise spaced apart forward and aft sets of pressure and suction side ears extending circumferentially or perpendicularly away from pressure and suction side surfaces of the outer vane mount.

16. A vane as claimed in claim 15, further comprising the outer spars being integral with the bridge.

17. A vane as claimed in claim 16, further comprising the outer spars having been integrally formed with the bridge by forging or casting.

18. A vane as claimed in claim 17, further comprising the outer spars adhesively bonded to the composite airfoil within the outer pockets.

19. A vane as claimed in claim 12, further comprising:
the composite airfoil further supported by an inner vane mount including forward and aft inner spars extending radially outwardly from an inner bridge of the inner vane mount,
forward and aft inner pockets disposed in the composite airfoil, and
the forward and aft spars received within the forward and aft inner pockets.

20. A vane as claimed in claim 19, further comprising the forward and aft outer spars adhesively bonded to the composite airfoil within the forward and aft outer pockets the forward and aft pockets inner spars adhesively bonded to the composite airfoil within the forward and aft inner pockets.

21. A vane as claimed in claim 20, further comprising:
a passage in the composite airfoil,
the passage extending between the airfoil base and the airfoil tip, and
the passage disposed chordwise between the forward and aft outer pockets and the forward and aft inner pockets.

22. A vane as claimed in claim 21 further comprising the outer bridge extending axially between chordwise spaced apart forward and aft sets of pressure and suction side ears extending circumferentially or perpendicularly away from pressure and suction side surfaces of the outer vane mount.

23. A vane as claimed in claim 22, further comprising the outer spars being integral with the bridge.

24. A vane as claimed in claim 14, further comprising a metallic leading edge tip disposed along the leading edge of the composite airfoil.

25. A gas turbine engine annular fan frame comprising:
an annular row of composite outlet guide vanes extending radially between and connecting radially inner and outer rings of the fan frame,
each of the vanes including a composite airfoil having pressure and suction sides extending outwardly from an airfoil base to an airfoil tip,
the outlet guide vanes mounted in axially extending inner and outer vane mounts attached to the inner and outer rings respectively,
chordwise spaced apart leading and trailing edges of the composite airfoil at or near forward and aft ends of the outlet guide vane,
the inner vane mount including forward and aft inner spars extending radially outwardly from an inner bridge of the inner vane mount,
forward and aft inner pockets disposed in the composite airfoil and the forward and aft spars received within the forward and aft inner pockets respectively,
the outer vane mount including forward and aft outer spars extending radially inwardly from an outer bridge of the outer vane mount,
forward and aft outer pockets extending radially into the composite airfoil from the airfoil tip, and
the forward and aft outer spars completely received within the forward and aft outer pockets respectively and the forward and aft outer spars respectively completely encased by the composite airfoil.

26. A fan frame as claimed in claim 25, further comprising the forward and aft inner spars adhesively bonded to the composite airfoil within the forward and aft inner pockets respectively and the forward and aft outer spars adhesively bonded to the forward and aft outer pockets respectively.

27. A fan frame as claimed in claim 25, further comprising:
a passage in the composite airfoil,
the passage extending between the airfoil base and the airfoil tip, and
the passage disposed chordwise between the forward and aft outer pockets and the forward and aft inner pockets.

28. A fan frame as claimed in claim 27, further comprising the forward and aft inner spars adhesively bonded to the composite airfoil within the forward and aft inner pockets respectively and the forward and aft outer spars adhesively bonded to the forward and aft outer pockets respectively.

29. A fan frame as claimed in claim 27 further comprising a metallic leading edge tip disposed along the leading edge of the composite airfoil.

30. A fan frame as claimed in claim 28, further comprising the forward and aft inner spars being integral with the inner bridge and the forward and aft outer spars being integral with the outer bridge.

31. A fan frame as claimed in claim 30 further comprising a metallic leading edge tip disposed along the leading edge of the composite airfoil.

32. A fan frame as claimed in claim 30, further comprising the forward and aft inner spars having been integrally formed with the inner bridge and the forward and aft outer spars having been integrally formed with the outer bridge by forging or casting.

33. A gas turbine engine annular fan frame comprising:
an annular row of composite outlet guide vanes extending radially between and connecting radially inner and outer rings of the fan frame,
each of the vanes including a composite airfoil having pressure and suction sides extending outwardly from an airfoil base to an airfoil tip,
the outlet guide vanes mounted in axially extending inner and outer vane mounts attached to the inner and outer rings respectively,
chordwise spaced apart leading and trailing edges of the composite airfoil at or near forward and aft ends of the outlet guide vane,
the inner vane mount including one or more inner spars extending radially outwardly from an inner bridge of the inner vane mount,
one or more inner pockets disposed in the composite airfoil and the one or more spars received within the one or more inner pockets respectively,
the outer vane mount including one or more outer spars extending radially inwardly from an outer bridge of the outer vane mount,
one or more outer pockets extending radially into the composite airfoil from the airfoil tip, and
the one or more outer spars completely received within the one or more outer pockets respectively and the one or more outer spars completely encased by the composite airfoil.

34. A fan frame as claimed in claim 33, further comprising the one or more inner spars adhesively bonded to the composite airfoil within the one or more inner pockets respectively and the one or more outer spars adhesively bonded to the one or more outer pockets respectively.

35. A fan frame as claimed in claim 34, further comprising a passage extending between the airfoil base and the airfoil tip in the composite airfoil.

36. A fan frame as claimed in claim 35, further comprising the one or more inner spars adhesively bonded to the composite airfoil within the one or more inner pockets respectively and the one or more outer spars adhesively bonded to the one or more outer pockets respectively.

37. A fan frame as claimed in claim 35 further comprising a metallic leading edge tip disposed along the leading edge of the composite airfoil.

38. A fan frame as claimed in claim 35, further comprising the one or more inner spars being integral with the inner bridge and the one or more outer spars being integral with the outer bridge.

39. A fan frame as claimed in claim 38 further comprising a metallic leading edge tip disposed along the leading edge of the composite airfoil.

40. A fan frame as claimed in claim 38, further comprising the one or more inner spars having been integrally formed with the inner bridge and the one or more outer spars having been integrally formed with the outer bridge by forging or casting.

41. A vane comprising:
a composite airfoil having pressure and suction sides extending radially outwardly from an airfoil base to an airfoil tip,
chordwise spaced apart leading and trailing edges of the composite airfoil at or near forward and aft ends of the vane,
the composite airfoil supported by an outer vane mount,
the outer vane mount including forward and aft outer spars extending radially inwardly from an outer bridge of the outer vane mount,
forward and aft outer pockets extending radially into the composite airfoil from the airfoil tip,
the forward and aft outer spars completely received within the forward and aft outer pockets respectively,
the forward and aft outer spars completely encased by the composite airfoil,
the outer bridge extending axially between chordwise spaced apart forward and aft sets of pressure and suction side ears extending circumferentially or perpendicularly away from pressure and suction side surfaces of the outer vane mount,
a depressed outer surface of the outer bridge between the forward and aft sets of pressure and suction side ears, and
a middle section of the outer bridge between the forward and aft sets of pressure and suction side ears including a bridge depression extending into the middle section and outwardly bounded by the depressed outer surface.

42. A vane as claimed in claim 41, further comprising the forward and aft outer spars adhesively bonded to the composite airfoil within the forward and aft outer pockets.

43. A vane as claimed in claim 41, further comprising:
a passage in the composite airfoil,
the passage extending between the airfoil base and the airfoil tip, and
the passage disposed chordwise between the forward and aft outer pockets.

* * * * *

UNITED STATES PATENT AND TRADEMARK OFFICE
CERTIFICATE OF CORRECTION

PATENT NO.         : 8,690,531 B2                                    Page 1 of 1
APPLICATION NO.    : 12/982448
DATED              : April 8, 2014
INVENTOR(S)        : Tudor et al.

It is certified that error appears in the above-identified patent and that said Letters Patent is hereby corrected as shown below:

On the Title Page, in Item (73), under "Assignee:", in Column 1, Line 1, delete "Electroc" and insert -- Electric --, therefor.

In the Specification

In Column 2, Line 27, delete "my be" and insert -- may be --, therefor.

In Column 4, Line 56, delete "outle3" and insert -- outlet --, therefor.

In the Claims

In Column 7, Line 57, in Claim 20, delete "pockets the" and insert -- pockets, the --, therefor.

Signed and Sealed this
Thirty-first Day of March, 2015

Michelle K. Lee
*Director of the United States Patent and Trademark Office*